(12) United States Patent
Tang

(10) Patent No.: US 11,711,836 B2
(45) Date of Patent: *Jul. 25, 2023

(54) METHOD, DEVICE, STORAGE MEDIUM, AND SYSTEM FOR DETERMINING TIME-DOMAIN RESOURCE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 192 days.

This patent is subject to a terminal disclaimer.

(21) Appl. No.: 17/136,827

(22) Filed: Dec. 29, 2020

(65) Prior Publication Data

US 2021/0120570 A1 Apr. 22, 2021

Related U.S. Application Data

(63) Continuation of application No. 16/724,099, filed on Dec. 20, 2019, now Pat. No. 10,986,652, which is a
(Continued)

(51) Int. Cl.
*H04W 4/00* (2018.01)
*H04W 72/50* (2023.01)
(Continued)

(52) U.S. Cl.
CPC ..... *H04W 72/535* (2023.01); *H04W 72/0446* (2013.01); *H04W 72/1263* (2013.01);
(Continued)

(58) Field of Classification Search
CPC ........... H04W 72/1257; H04W 72/042; H04W 72/0446; H04W 72/0493; H04W 72/1263;
(Continued)

(56) References Cited

U.S. PATENT DOCUMENTS 6,954,616 B2 * 10/2005 Liang ................ H04W 72/1215
455/63.2
8,537,760 B2 9/2013 Tsai et al.
(Continued)

FOREIGN PATENT DOCUMENTS

CN 101299634 A 11/2008
CN 102088786 A 6/2011
(Continued)

OTHER PUBLICATIONS

Samsung, "Resource Allocation for PUCCH with HARQ-ACK", 3GPP TSG RAN WG1 NR Ad-Hoc#2 R1-1710709, Qingdao, P.R. China Jun. 27-30, 2017. 4 pages.
(Continued)

*Primary Examiner* — Stephen M D Agosta
(74) *Attorney, Agent, or Firm* — Perkins Coie LLP

(57) ABSTRACT

A method, device, storage medium and system for determining a time-domain resource determination are provided. The method includes that: allocation information for scheduling a time-domain resource is received from a network device (S401), the time-domain resource to be scheduled including a time-domain resource required by channel transmission; a time-domain position is determined for the time-domain resource to be scheduled based on a preset rule according to UL/DL time-domain resource configuration information and the allocation information; and channel transmission is performed with the network device through the time-domain resource to be scheduled according to the time-domain position corresponding to the time-domain resource to be scheduled.

18 Claims, 9 Drawing Sheets

Related U.S. Application Data continuation of application No. PCT/CN2017/101786, filed on Sep. 14, 2017.

(51) Int. Cl.
*H04W 76/27* (2018.01)
*H04W 72/0446* (2023.01)
*H04W 72/1263* (2023.01)
*H04W 72/23* (2023.01)
*H04W 72/53* (2023.01)

(52) U.S. Cl.
CPC ........... *H04W 72/23* (2023.01); *H04W 72/53* (2023.01); *H04W 76/27* (2018.02)

(58) Field of Classification Search
CPC ............ H04W 72/1289; H04W 76/27; H04W 72/0453; H04W 16/10; H04W 72/12; H04L 5/0053; H04L 5/0044; H04L 5/1469; H04B 7/0626; H04B 7/0417; H04B 7/2656; H04B 7/04; H04B 7/0478; H04B 7/06; H04B 7/0639; H04J 11/00; H04J 11/0056; H04J 4/00; H04J 11/005; H04M 2201/12; H04M 2201/36; H04M 3/5233

See application file for complete search history.

(56) References Cited

U.S. PATENT DOCUMENTS

| | | | |
|---|---|---|---|
| 8,553,593 B2* | 10/2013 | Lim | H04W 72/042 370/329 |
| 8,929,319 B2* | 1/2015 | Anderson | H04L 5/0037 370/329 |
| 9,686,798 B1 | 6/2017 | Zhao et al. | |
| 10,181,936 B2* | 1/2019 | Kim | H04L 1/1896 |
| 2008/0233966 A1 | 9/2008 | Scheim et al. | |
| 2009/0135766 A1 | 5/2009 | Vitebsky et al. | |
| 2009/0257421 A1 | 10/2009 | Nakashima et al. | |
| 2009/0274086 A1 | 11/2009 | Petrovic | |
| 2010/0046382 A1* | 2/2010 | Asplund | H04B 17/309 370/252 |
| 2010/0142467 A1 | 6/2010 | Tiirola | |
| 2010/0202420 A1 | 8/2010 | Jersenius et al. | |
| 2011/0267996 A1* | 11/2011 | Guan | H04W 72/042 370/278 |
| 2011/0280226 A1 | 11/2011 | Lennvall et al. | |
| 2012/0039288 A1* | 2/2012 | Kim | H04L 5/0039 370/329 |
| 2012/0195292 A1 | 8/2012 | Ko et al. | |
| 2012/0287883 A1* | 11/2012 | Sabella | H04L 1/0009 370/329 |
| 2012/0314588 A1 | 12/2012 | Nammi | |
| 2013/0077606 A1 | 3/2013 | Wu | |
| 2013/0121130 A1 | 5/2013 | Ko et al. | |
| 2013/0235727 A1 | 9/2013 | Campbell et al. | |
| 2013/0242890 A1 | 9/2013 | He | |
| 2013/0294309 A1* | 11/2013 | Choi | H04L 5/0053 370/311 |
| 2014/0043955 A1 | 2/2014 | Ko et al. | |
| 2014/0080509 A1* | 3/2014 | Siomina | G01S 5/10 455/456.1 |
| 2014/0126531 A1 | 5/2014 | Kang | |
| 2014/0269527 A1* | 9/2014 | Asokan | H04L 5/001 370/329 |
| 2014/0313908 A1 | 10/2014 | Da et al. | |
| 2014/0321303 A1* | 10/2014 | Iyer | H04L 43/50 370/252 |
| 2015/0124771 A1 | 5/2015 | Ko et al. | |
| 2015/0131565 A1* | 5/2015 | Nakashima | H04L 1/0026 370/329 |
| 2015/0173099 A1 | 6/2015 | Sun et al. | |
| 2015/0181609 A1 | 6/2015 | Nusairat et al. | |
| 2015/0237645 A1* | 8/2015 | Andrianov | H04W 72/1215 370/329 |
| 2015/0296387 A1* | 10/2015 | Li | H04W 72/12 455/454 |
| 2015/0373731 A1 | 12/2015 | Quan et al. | |
| 2016/0021642 A1 | 1/2016 | Kim et al. | |
| 2016/0150541 A1 | 5/2016 | Park et al. | |
| 2016/0157223 A1* | 6/2016 | Nogami | H04W 72/0446 370/329 |
| 2016/0164643 A1* | 6/2016 | Loehr | H04L 1/1854 370/336 |
| 2016/0183262 A1 | 6/2016 | Fan et al. | |
| 2016/0254889 A1 | 9/2016 | Shattil | |
| 2016/0277954 A1 | 9/2016 | Frenne et al. | |
| 2016/0295525 A1 | 10/2016 | Zhu et al. | |
| 2016/0366696 A1 | 12/2016 | Åhlander et al. | |
| 2017/0034844 A1* | 2/2017 | Khoury | H04W 74/04 |
| 2017/0078830 A1* | 3/2017 | Wu | H04L 5/0053 |
| 2017/0135128 A1* | 5/2017 | Yerramalli | H04W 74/006 |
| 2017/0290048 A1 | 10/2017 | Amuru et al. | |
| 2017/0347351 A1* | 11/2017 | Cai | H04W 4/70 |
| 2018/0048421 A1* | 2/2018 | Yeo | H04L 1/0065 |
| 2018/0049203 A1* | 2/2018 | Xue | H04L 5/0053 |
| 2018/0145851 A1* | 5/2018 | Kusashima | H04J 11/0079 |
| 2018/0167115 A1 | 6/2018 | Zhu et al. | |
| 2018/0220462 A1* | 8/2018 | Kusashima | H04W 74/0816 |
| 2018/0241525 A1* | 8/2018 | Ouchi | H04L 5/0053 |
| 2018/0343650 A1 | 11/2018 | Zhou | |
| 2019/0020458 A1 | 1/2019 | Ko et al. | |
| 2019/0069320 A1* | 2/2019 | Gao | H04W 72/1284 |
| 2019/0132834 A1* | 5/2019 | Yan | H04W 72/0413 |
| 2019/0149365 A1* | 5/2019 | Chatterjee | H04L 5/0044 370/329 |
| 2019/0394759 A1* | 12/2019 | Ying | H04W 76/27 |
| 2020/0128571 A1 | 4/2020 | Tang | |
| 2021/0099255 A1* | 4/2021 | Gao | H04L 5/0055 |
| 2021/0119755 A1 | 4/2021 | Ko et al. | |
| 2021/0314033 A1* | 10/2021 | Fakoorian | H04W 72/535 |
| 2022/0140958 A1* | 5/2022 | Zhou | H04L 1/1887 370/329 |

FOREIGN PATENT DOCUMENTS

| | | |
|---|---|---|
| CN | 102301772 A | 12/2011 |
| CN | 103313417 A | 9/2013 |
| CN | 104349464 A | 2/2015 |
| CN | 105792365 A | 7/2016 |
| CN | 106304350 A | 1/2017 |
| CN | 106559841 A | 4/2017 |
| CN | 107124767 A | 9/2017 |
| EP | 2958356 A1 | 12/2015 |
| EP | 3413651 A1 | 12/2018 |
| RU | 2447614 C2 | 4/2012 |
| TW | 201642702 A | 12/2016 |
| WO | 2017116108 A1 | 7/2017 |
| WO | 2017133378 A1 | 8/2017 |
| WO | 2017133440 A1 | 8/2017 |

OTHER PUBLICATIONS

Supplementary European Search Report in the European application No. 21210500.1, dated Mar. 22, 2022. 15 pages.
Supplementary European Search Report in the European application No. 22150522.5, dated Apr. 20, 2022. 12 pages.
First Office Action of the Chilean application No. 202000016, dated Mar. 16, 2021.
First Office Action of the Indian application No. 202017000565, dated May 8, 2021.
First Office Action of the U.S. Appl. No. 16/625,980, dated Jun. 7, 2021.
CMCC; "Discussion on Signalling and UE behavior for DL and UL transmission assignment", 3GPP TSG RAN WG1 Meeting #90, Prague, P.R. Czechia Aug. 21-25, 2017, R1-1713846, URL: https://www.3gpp.org/ftp/TSG_RAN/WG1_RL1/TSGR1_90/Docs, section 1-3.

(56) References Cited

OTHER PUBLICATIONS

English translation of the Written Opinion of the International Search Authority in the international application No. PCT/CN2017/101786, dated Jun. 4, 2018.
English translation of the Written Opinion of the International Search Authority in the international application No. PCT/CN2018/103458, dated Dec. 5, 2018.
First Office Action of the Chinese application No. 201911323531.3, dated Nov. 2, 2020.
International Search Report in the international application No. PCT/CN2017/101786, dated Jun. 4, 2018 (2 pages).
International Search Report in the international application No. PCT/CN2018/103458, dated Dec. 5, 2018.
MCC Support; "Final Report of 3GPP TSG RAN WG1 #90 v1.0.0 (Prague, Czech Rep, Aug. 21-25, 2017)"; 3GPP TSG RAN WG1 Meeting #90bis R1-1716941, Prague, Czech Rep, Oct. 9-13, 2017.
Samsung; "DL/UL Resource Allocation", 3GPP TSG RAN WG1 Meeting NR#3, Nagoya, Japan, Sep. 18-21, 2017, R1-1716004, URL: https://www.3gpp.org/ftp/TSG_RAN/WG1_RL1/TSGR1_AH/NR_AH_1709/Docs, section 3.
Supplementary European Search Report in the European application No. 17925003.0, dated Apr. 1, 2020.
Supplementary European Search Report in the European application No. 18855275.6, dated May 6, 2020.
CATT: "NR DL/UL time domain resource allocation" 3GPP Draft; R1-1712411, 3rd Generation Partnership Project (3GPP), Mobile Competence Centre; 650, Route Des Lucioles; F-06921 Sophia-Antipolis Cedex France, vol. RAN WG1, No. Prague, Czechia;Aug. 21, 2017-Aug. 25, 2017Aug. 20, 2017 (Aug. 20, 2017), XP051315227, Retrieved from the Internet: URL: http://www.3gpp. org/ftp/Meetings 3GPP SYNC/RAN1/Docs/[ retrieved on Aug. 20, 2017]* figures 1-4 ** sections 2-3 *.
Guangdong OPPO Mobile Telecom: "Resource allocation for PDSCH/PUSCH", 3GPP Draft: R1-1715690. 3rd Generation Partnership Project (3GPP), Mobilecompetence Centre; 650, Route Des Lucioles: F-06921 Sophia-Antipolis Cedex; France, vol. RAN WG1, No. Nagoya, Japan; Sep. 18, 2017-Sep. 21, 2017Sep. 11, 2017 (Sep. 11, 2017), XP051329142 Retrieved from the Internet: URL: http://www.3gpp. org/ftp/tsg_ran/WG1 RL1/TSGR1 AH/NR AH 1709/Docs/[ retrieved onSep. 11, 2017]* tables 3, 4 ** figures 1.
LG Electronics: "Discussion on resource allocation and TBS determination" 3GPP Draft; R1-1715885 Discussion on Resource Allocation and TBS Determination VF, 3rd Generation Partnership Project (3GPP), Mobile Competence Centre; 650, Route Des Lucioles ; F-06921 Sophia-Antipolis, vol. RAN WG1, No. Nagoya, Japan; Sep. 18, 2017-Sep. 21, 2017Sep. 12, 2017 (Sep. 12, 2017), XP051329569, Retrieved from the Internet: URL: http://www.3gpp.org/ftp/tsg-ran/WG1_RL1/TSGRI AH/NR AH 1709/Docs/ [retrieved onSep. 12, 2017] sections 3-5 *.
First Office Action of the Israeli application No. 271250, dated Jun. 30, 2022.
CATT, "PDSCH and PUSCH resource allocation", 3GPP TSG RAN WG1 Meeting 90bis R1-1717833, Prague, CZ, Oct. 9-13, 2017.
Notice of Allowance of the Korean application No. 10-2020-7000754, dated Aug. 18, 2022.
First Office Action of the Korean application No. 10-2020-7000754, dated Feb. 24, 2022. 8 pages with English translation.

Notice of Allowance of the U.S. Appl. No. 16/625,980, dated Dec. 10, 2021. 22 pages.
First Office Action of the European application No. 18855275.6, dated Jan. 15, 2021.
First Office Action of the U.S. Appl. No. 16/724,099, dated Mar. 13, 2020.
Notice of Allowance of the Russian application No. 2020101949, dated Dec. 8, 2020.
First Office Action of the Canadian application No. 3066927, dated Feb. 17, 2021.
Notice of Allowance of the U.S. Appl. No. 16/724,099, dated Jun. 26, 2020.
Corrected Notice of Allowance of the U.S. Appl. No. 16/724,099, dated Aug. 12, 2020.
Notice of Allowance of the U.S. Appl. No. 16/724,099, dated Sep. 25, 2020.
Corrected Notice of Allowance of the U.S. Appl. No. 16/724,099, dated Jan. 13, 2021.
Corrected Notice of Allowance of the U.S. Appl. No. 16/724,099, dated Feb. 10, 2021.
Corrected Notice of Allowance of U.S. Appl. No. 16/724,099, dated Dec. 23, 2020.
CATT, PDSCH and PUSCH resource allocation [online], 3GPP TSG RAN WG1 adhoc_NR_AH_1709 R1-1715824, Sep. 12, 2017, [Search date: Sep. 15, 2021], <URL: https://www.3gpp.org/ftp/tsg_ran/WG1_RL1/TSGR1_AH/NR_AH_1709/Docs/R1-1715824.zip>, section 3.2.2. 11 pages.
First Office Action of the Japanese application No. 2020-500602, dated Sep. 28, 2021. 8 pages with English translation.
First Office Action of the Taiwanese application No. 107132553, dated Oct. 29, 2021. 12 pages with English translation.
Final Office Action of the U.S. Appl. No. 16/625,980, dated Sep. 17, 2021. 24 pages.
Corrected Notice of Allowability dated Mar. 22, 2021 of U.S. Appl. No. 16/724,099, filed Dec. 21, 2019. 8 pages.
ZTE,"Consideration on long-PUCCH over slots", 3GPP TSG RAN WG1 #90 R1-1712453 Prague, Czechia, Aug. 21-25, 2017. 4 pages.
ZTE, Sanechips,"Support of long-PUCCH over multiple slots", 3GPP TSG RAN WG1 Meeting NR#3 R1-1715525 Nagoya, Japan, Sep. 18-21, 2017. 4 pages.
CMCC,"Discussion on Signalling and UE behavior for DL and UL transmission assignment", 3GPP TSG RAN WG1 Meeting #90, R1-1713846, Prague, P.R. Czechia Aug. 21-25, 2017. 5 pages.
Samsung, "DL/UL Resource Allocation", 3GPP TSG RAN WG1 Meeting NR#3 R1-1716004, Nagoya, Japan, Sep. 18-21, 2017. 12 pages.
First Office Action of the Chinese application No. 202010078391.4, dated Oct. 8, 2022. 17 pages with English translation.
Guangdong OPPO Mobile Telecom, "Resource allocation for PUCCH", 3GPP TSG RAN WG1 Meeting NR#3 R1-1715689, Nagoya, Japan, Sep. 18-21, 2017, pp. 1-8.
Intel Corporation, "Time-domain resource allocation for DL and UL data", 3GPP TSG RAN WG1 NR Ad-hoc#2 R1-1710566, Qingdao, P. R. China, Jun. 27-30, 2017, pp. 1-6.
First Office Action of the Korean application No. 10-2022-7040561, dated Jan. 6, 2023, pp. 1-9.

* cited by examiner

METHOD, DEVICE, STORAGE MEDIUM, AND SYSTEM FOR DETERMINING TIME-DOMAIN RESOURCE

CROSS-REFERENCE TO RELATED APPLICATION

This application is a continuation of U.S. patent application Ser. No. 16/724,099 which claims priority to PCT Application No. PCT/CN2017/101786, filed on Sep. 14, 2017, and entitled "METHOD, DEVICE, STORAGE MEDIUM, AND SYSTEM FOR DETERMINING TIME-DOMAIN RESOURCE", the disclosure of which are hereby incorporated by reference in their entirety.

BACKGROUND

Along with development of communication technologies, researches on 5th Generation (5G) have been made. Radio access of 5G is called New Radio (NR). 5G is required to support a ultrahigh data transmission rate, massive data connections and a relatively low data transmission delay, therefore, a 5G NR system, compared with a present Long Term Evolution (LTE) system, may not only implement resource allocation taking a slot as a unit, but also implement resource allocation by taking a symbol in a slot as a unit, which may be called symbol-level resource allocation, to improve flexibility of resource allocation and reduce delay in data transmission.

In a 5G NR system, a 5G base station, i.e., a gNB, may perform symbol-level scheduling on a time-domain resource for transmitting a channel, and may also dynamically or semi-persistently perform symbol-level configuration on the time-domain resource. Therefore, a conflict between time-domain resource scheduling information and time-domain resource configuration information of the gNB may cause a condition that a terminal cannot transmit a channel within a short time period.

SUMMARY

The disclosure relates to the technical field of wireless communications, and more particularly to a method, device, storage medium and system for determining a time-domain resource.

Embodiments of the disclosure are intended to provide a method, device, storage medium and system for determining a time-domain resource, which may avoid the condition that a terminal may not transmit a channel in a short time period due to a conflict between scheduling information and configuration information.

According to a first aspect, an embodiment of the disclosure provides a method for determining a time-domain resource, which may be applied to a terminal and include the following operations.

Allocation information for scheduling a time-domain resource is received from a network device.

The time-domain resource to be scheduled may include a time-domain resource for transmission of a channel.

A time-domain position is determined for the time-domain resource to be scheduled based on a preset rule according to Uplink (UL)/Downlink (DL) time-domain resource configuration information and the allocation information.

Channel transmission is performed with the network device through the time-domain resource to be scheduled according to the time-domain position corresponding to the time-domain resource to be scheduled.

According to a second aspect, an embodiment of the disclosure provides a method for determining a time-domain resource, which may be applied to a network device and include the following operations.

Allocation information for scheduling a time-domain resource is transmitted to a terminal, the time-domain resource to be scheduled including a time-domain resource for transmission of a channel and the allocation information being used for the terminal to determine a time-domain position corresponding to the time-domain resource to be scheduled.

Channel transmission is performed with the network device through the time-domain resource to be scheduled according to the time-domain position corresponding to the time-domain resource to be scheduled.

According to a third aspect, an embodiment of the disclosure provides a terminal, which may include a receiving part, a determination part and a first transmission part.

The receiving part may be configured to receive allocation information for scheduling a time-domain resource from a network device, the time-domain resource to be scheduled including a time-domain resource for transmission of a channel.

The determination part may be configured to determine a time-domain position corresponding to the time-domain resource to be scheduled based on a preset rule according to UL/DL time-domain resource configuration information and the allocation information.

The first transmission part may be configured to perform channel transmission with the network device through the time-domain resource to be scheduled according to the time-domain position corresponding to the time-domain resource to be scheduled.

According to a fourth aspect, an embodiment of the disclosure provides a network device, which may include a sending part and a second transmission part.

The sending part may be configured to transmit allocation information for scheduling a time-domain resource to a terminal, the time-domain resource to be scheduled including a time-domain resource for transmission of a channel and the allocation information being used for the terminal to determine a time-domain position corresponding to the time-domain resource to be scheduled.

The second transmission part may be configured to perform channel transmission with the network device through the time-domain resource to be scheduled according to the time-domain position corresponding to the time-domain resource to be scheduled.

According to a fifth aspect, an embodiment of the disclosure provides a computer-readable medium, which may store a program of determining a time-domain resource, the program being executable by at least one processor to implement the operations in the first aspect.

According to a sixth aspect, an embodiment of the disclosure provides a computer-readable medium, which may store a program of determining a time-domain resource, the program being executable by at least one processor to implement the operations in the second aspect.

According to a seventh aspect, an embodiment of the disclosure provides a terminal, which may include a first network interface, a first memory and a first processor.

The first network interface may be configured to receive and transmit a signal in a process of receiving and transmitting information from and to another external network element.

The first memory may be configured to store a computer program capable of running in the first processor.

The first processor may be configured to run the computer program to execute the operations of the method in the first aspect.

According to an eighth aspect, an embodiment of the disclosure provides a network device, which may include a second network interface, a second memory and a second processor.

The second network interface may be configured to receive and transmit a signal in a process of receiving and transmitting information from and to another external network element.

The second memory may be configured to store a computer program capable of running in the second processor.

The second processor may be configured to run the computer program to execute the operations of the method in the second aspect.

According to a ninth aspect, the embodiments of the disclosure provide a system for transmitting a time-domain resource, which may include a terminal and a network device.

The network device may be configured to:
transmit allocation information for scheduling a time-domain resource to the terminal, the time-domain resource to be scheduled including a time-domain resource for transmission of a channel and the allocation information being used for the terminal to determine a time-domain position corresponding to the time-domain resource to be scheduled, and perform channel transmission with the network device through the time-domain resource to be scheduled according to the time-domain position corresponding to the time-domain resource to be scheduled.

The terminal may be configured to:
receive the allocation information for scheduling a time-domain resource from the network device, the time-domain resource to be scheduled including the time-domain resource for transmission of a channel, determine the time-domain position corresponding to the time-domain resource to be scheduled based on a preset rule according to UL/DL time-domain resource configuration information and the allocation information, and perform channel transmission with the network device through the time-domain resource to be scheduled according to the time-domain position corresponding to the time-domain resource to be scheduled.

The embodiments of the disclosure provide the method, the device, the storage medium and the system for determining a time-domain resource. A terminal determines a time-domain position corresponding to a time-domain resource to be scheduled according to a determination rule predetermined with a base station to make the determined time-domain position matched with scheduling information regulated by the base station for the time-domain resource to be scheduled, so that the condition that the terminal may not transmit a channel within a short time period due to a conflict with time-domain configuration information during channel transmission of the terminal is avoided, a signaling overhead during channel transmission of the terminal and the base station is also reduced, and increased probability of false detection caused by repeated transmission of control signaling is further avoided.

DETAILED DESCRIPTION

In order to make the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Figure 1:
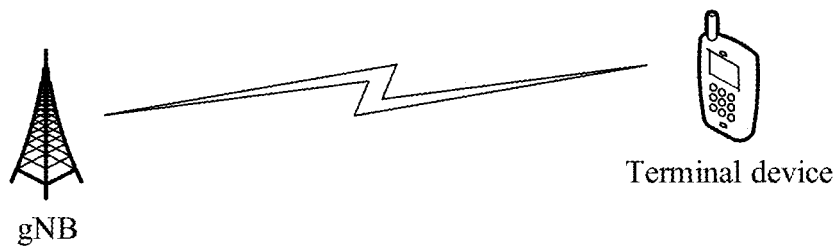
FIG. 1 is a schematic diagram of an application scenario according to an embodiment of the disclosure.

Referring to FIG. 1, an atypical application scenario according to an embodiment of the disclosure is shown. The scenario may include a network device and a terminal device. The network device may be an Evolved Node B (eNB) in an LTE system, or may also be a gNB in a 5G NR system or, may also be other network devices capable of providing the terminal device with a function of accessing a mobile communication network. The terminal device may be a cell phone, a smart phone, a Session Initiation Protocol (SIP) phone, a laptop computer, a Personal Digital Assistant (PDA), satellite ratio, a global positioning system, a multimedia device, a video device, a digital audio player (for example, a Moving Picture Experts Group Audio Layer-3 (MP3) player), a camera, a game console, a tablet computer or any other device with a similar function. In addition, the terminal device may also be called, by those skilled in the art, user equipment, a terminal, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client or some other proper terms.

In the application scenario shown in FIG. 1, during multi-slot or slot aggregation scheduling, a base station may configure a starting symbol and a terminating symbol for channel transmission in each of multiple slots, thereby implementing symbol-level configuration. In addition, the base station may also perform symbol-level scheduling for slots used for channel transmission. In the embodiment of the disclosure, a channel to be transmitted may include a data channel such as a Physical Downlink Shared Channel (PDSCH) and a Physical Uplink Shared Channel (PUSCH), and may also include a control channel such as a Physical Downlink Control Channel (PDCCH) and a Physical Uplink Control Channel (PUCCH). For describing the technical solutions of the embodiments of the disclosure clearly, descriptions are made preferably with a DL data channel such as a PDSCH as an example in the embodiments of the disclosure. It can be understood that those skilled in the art may apply the technical solutions of the embodiments of the disclosure to channels of other types under the guidance of the DL data channel.

A conflict between symbol-level scheduling and symbol-level configuration of a time-domain resource such as a slot may make a terminal impossible to transmit a channel within a short time period. Specific conflict conditions may at least include the following two examples.

First Example

Figure 2:
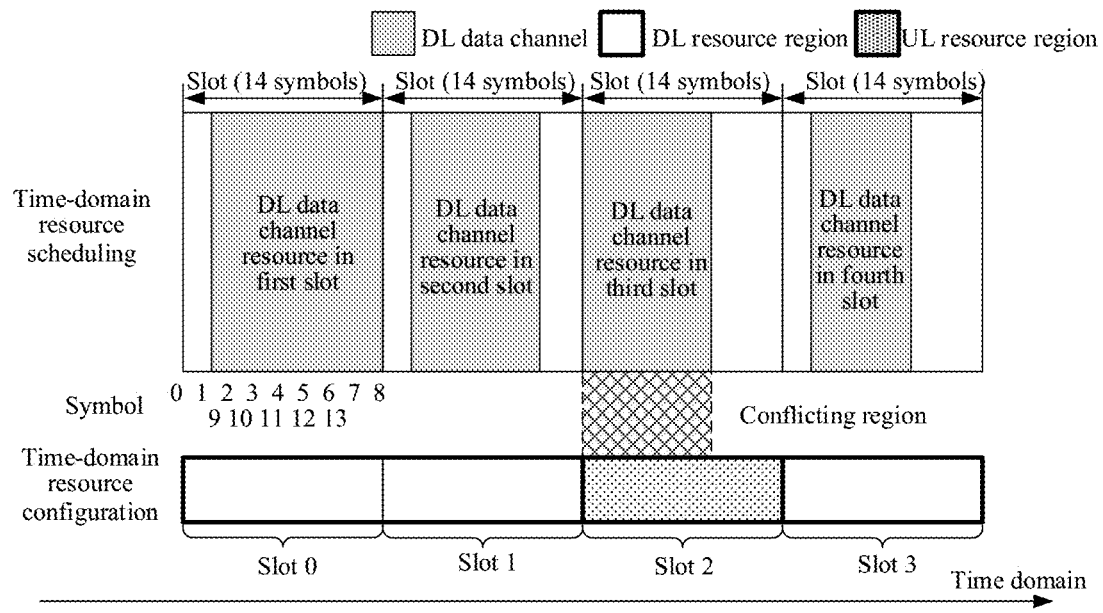
FIG. 2 is a schematic diagram of a conflict according to an embodiment of the disclosure.

As shown in FIG. 2, a channel to be transmitted is a DL data channel such as a PDSCH, for example. A gNB may schedule part of symbol resources in each of four slots, i.e., slot 0, slot 1, slot 2 and slot 3 respectively, to transmit the DL data channel. Each slot has a length of 14 symbols, but not all symbols in the slots are needed to be occupied when the four slots are scheduled to transmit the PDSCH. On the other hand, the gNB, when making symbol-level configuration of a time-domain resource for a terminal, may configure all the symbols in the slot 2 for transmission of a UL channel, as shown in dotted blocks in FIG. 2. In such case, scheduled resources in the slot 2 may wholly conflict with resources configured for the slot 2, like a conflict region filled with cross lines in FIG. 2.

Second Example

Figure 3:
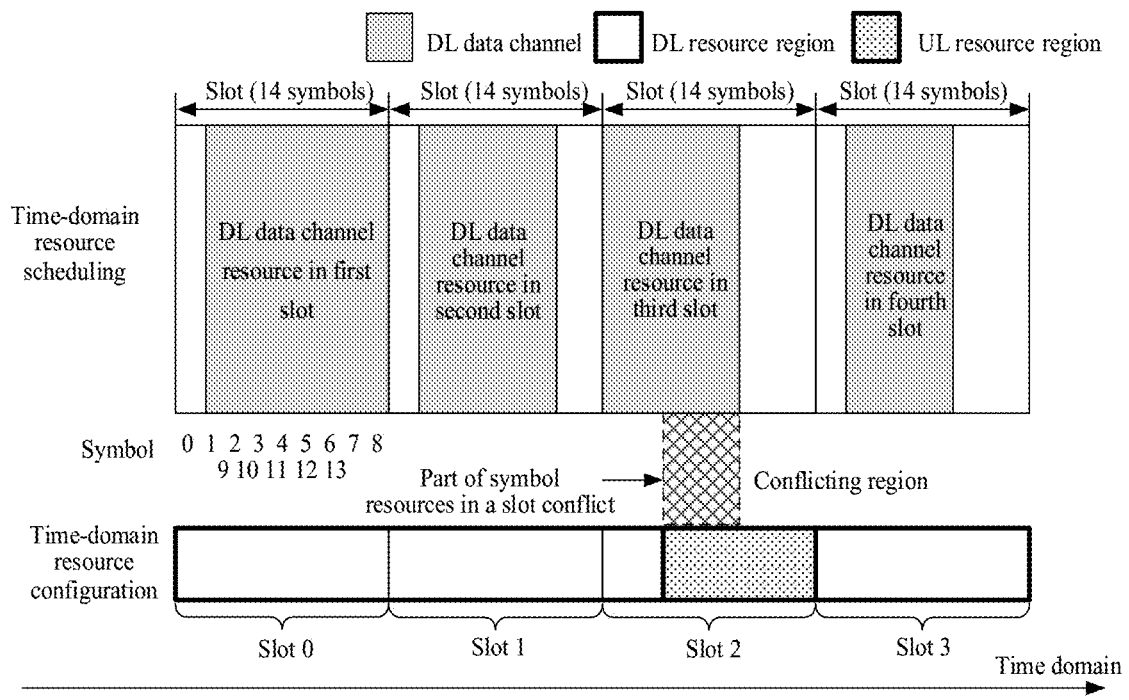
FIG. 3 is another schematic diagram of a conflict according to an embodiment of the disclosure.

As shown in FIG. 3, a channel to be transmitted is a DL data channel such as a PDSCH, for example. A gNB may schedule part of symbol resources in each slot in four slots for transmission, i.e., slot 0, slot 1, slot 2 and slot 3 respectively. Each slot has a length of 14 symbols, but not all symbols in the slots are required to be occupied when the four slots are scheduled to transmit the PDSCH. On the other hand, the gNB, when making symbol configuration of a time-domain resource for a terminal, may configure part of symbols in the slot 2 for transmission of a UL channel, as shown in dotted blocks in FIG. 3. In such case, part of symbols of scheduled resources in the slot 2 may wholly conflict with resources configured for the slot 2, like a conflict region filled with cross lines in FIG. 3.

The specific conflict condition is not limited to the two examples. It is to be pointed out that a base station confronted with the above-described conflicts, for solving the conflicts, may regulate a time-domain resource to be scheduled during time-domain resource scheduling to avoid the conflicts. However, the base station, after regulating the time-domain resource to be scheduled, is required to notify a terminal of a scheduling state of the regulated time-domain resource, which may bring a high signaling overhead. Moreover, when the base station is required to notify, through control signaling, the terminal of regulation of time-domain resource scheduling for many times, a probability of false detection of the terminal over control signaling may also be increased. According to the technical solutions of the embodiments of the disclosure, after the base station regulates the time-domain resource to be scheduled, the signaling overhead in notifying the terminal may be reduced, and detection reliability of control signaling may be improved.

Embodiment 1

Figure 4:
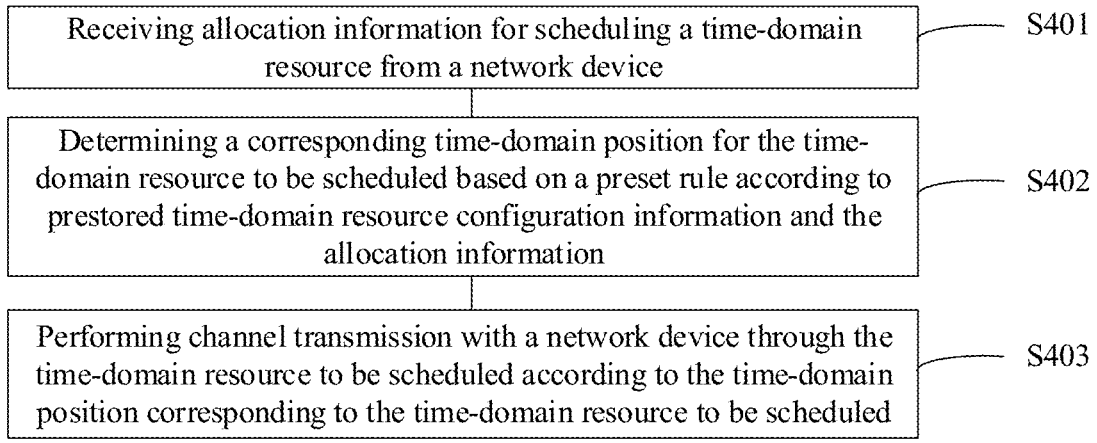
FIG. 4 is a flowchart of a method for determining a time-domain resource according to an embodiment of the disclosure.

Referring to FIG. 4, a method for determining a time-domain resource provided in the embodiment of the disclosure is shown. The method may be applied to a terminal. The method may include the following operations.

In the operation S401, allocation information for scheduling a time-domain resource is received from a network device.

The time-domain resource to be scheduled may include a time-domain resource required by channel transmission.

In the operation S402, a time-domain position is determined for the time-domain resource to be scheduled based on a preset rule according to UL/DL time-domain resource configuration information and the allocation information.

In the operation S403, channel transmission is performed with the network device through the time-domain resource to be scheduled according to the time-domain position corresponding to the time-domain resource to be scheduled.

It is to be explained that a channel may include a data channel such as a PDSCH and a PUSCH, and may also include a control channel such as a PDCCH and a PUCCH.

It can be understood that the preset rule may be a determination rule predetermined by negotiation between the terminal and the network device such as a gNB. The gNB, in case of a conflict between scheduling of a time-domain resource and configuration of the time-domain resource, may regulate the time-domain resource to avoid the conflict, and a specific regulation manner or means for the gNB may be described in the determination rule. Therefore, the terminal, after learning the preset rule, may make the same regulation, like the gNB. The gNB, after regulating scheduling of the time-domain resource, is not required to notify the terminal, and a signaling overhead between the terminal and the gNB is reduced.

For the technical solution shown in FIG. 4, in a possible implementation mode, the allocation information for scheduling a time-domain resource may be carried in Downlink Control Information (DCI). It can be understood that the DCI may be dynamically configured such that the gNB may timely transmit the allocation information to the terminal and the terminal may timely determine the position of the time-domain resource to be scheduled to avoid a conflict.

For the technical solution shown in FIG. 4, in a possible implementation mode, the method may further include that: the UL/DL time-domain resource configuration information transmitted by the network device is received, the UL/DL time-domain resource configuration information including slot-level position information and/or symbol-level position information of an available time-domain resource. It is to be explained that information representing a slot-based position of the time-domain resource is called slot-level position information of the time-domain resource; and information representing a symbol-based position of the time-domain resource is called symbol-level position information of the time-domain resource.

Specifically, the UL/DL time-domain resource configuration information may be predefined information, or may also be carried in Radio Resource Control (RRC) signaling and/or DCI, and, in specific implementation, may be frame structure information and/or a Slot Format Indicator (SFI).

For the technical solution shown in FIG. 4, the allocation information for scheduling a time-domain resource is not scheduling information obtained after the gNB regulates the time-domain resource to be scheduled but description information of the time-domain resource to be scheduled, and the terminal, after learning the description information of the time-domain resource to be scheduled, may determine the time-domain position corresponding to the time-domain resource to be scheduled according to the determination rule obtained by negotiation with the gNB, so that the time-domain position, finally determined by the terminal and associated with the time-domain resource to be scheduled, is matched with the scheduling information obtained after the gNB regulates the time-domain resource to be scheduled. Therefore, the gNB is not needed to notify the terminal of the scheduling information obtained after the time-domain resource to be scheduled is regulated in a channel transmission process, the signaling overhead between the gNB and the terminal in the channel transmission process is reduced, and the increased probability of false detection caused by repeated transmission of control signaling is also avoided.

Therefore, in the embodiment, the allocation information for scheduling a time-domain resource may atypically include two conditions in terms of the description information of the time-domain resource to be scheduled.

First Condition

The allocation information for scheduling a time-domain resource includes information about the number of the time-domain resource to be scheduled. Specifically, the information about the number of the time-domain resource to be scheduled includes slot-level information about the number of the time-domain resource to be scheduled and/or symbol-level information about the number of the time-domain resource to be scheduled. It is to be explained that information configured to represent the slot-based number of the time-domain resource is called the slot-level information about the number of the time-domain resource and information configured to represent the symbol-based number of the time-domain resource is called the symbol-level information about the number of the time-domain resource.

Figure 5:
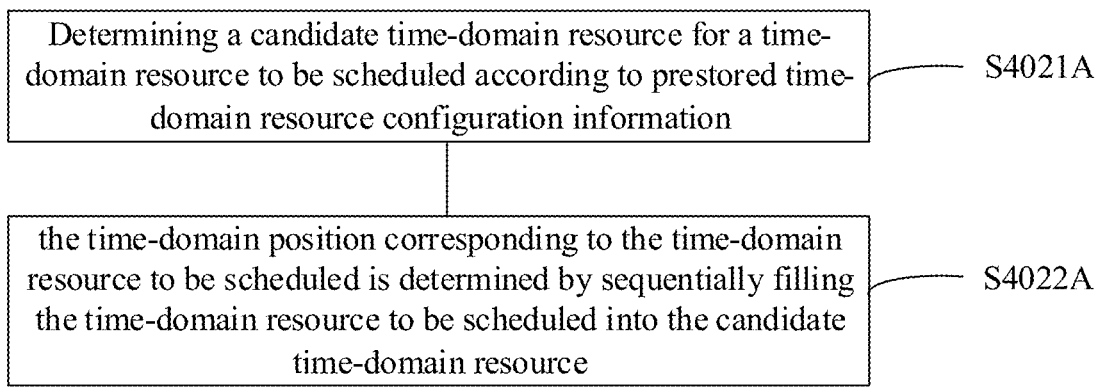
FIG. 5 is a flowchart of determining a time-domain position of a time-domain resource to be scheduled according to an embodiment of the disclosure.

Correspondingly, when the allocation information for scheduling a time-domain resource includes the information about the number of the time-domain resource to be scheduled, referring to FIG. 5, the operation in the operation S402 that the time-domain position is determined for the time-domain resource to be scheduled based on the preset rule according to the UL/DL time-domain resource configuration information and the allocation information may include the following operations.

In the operation S4021A, a candidate time-domain resource is determined for the time-domain resource to be scheduled according to the UL/DL time-domain resource configuration information. The amount of the candidate time-domain resource is matched with the amount of the time-domain resource to be scheduled, and the position of the candidate time-domain resource do not coincide with the position of the conflict time-domain resource of the UL/DL time-domain resource configuration information, the position of the conflict time-domain resource being a time-domain resource position with a channel transmission direction opposite to that of the time-domain resource to be scheduled in the UL/DL time-domain resource configuration information.

In the operation S4022A, the time-domain position corresponding to the time-domain resource to be scheduled is determined by sequentially filling the time-domain resource to be scheduled into the candidate time-domain resource.

It is to be noted that the terminal, after learning the information about the number of the time-domain resource to be scheduled, may determine the candidate time-domain resource not conflicting with the UL/DL time-domain resource configuration information and then sequentially fill the time-domain resource to be scheduled into the candidate time-domain resource. It can be understood that, since the information about the number of the time-domain resource to be scheduled may be slot-level number information and/or symbol-level number information, the terminal, when determining the candidate time-domain resource, may also determine the candidate time-domain resource in a slot-level and/or symbol-level manner. After the terminal determines the time-domain position corresponding to the time-domain resource to be scheduled according to the abovementioned process, consistency with the scheduling information obtained after the gNB regulates the time-domain resource to be scheduled is ensured, so that no signaling interaction is required to notify the terminal of the regulated scheduling information during channel transmission, the signaling overhead between the gNB and the terminal is reduced, and increased probability of false detection caused by repeated transmission of the control signaling is also avoided.

Second Condition

The allocation information for scheduling a time-domain resource includes information about the number of the time-domain resource to be scheduled and preselected position information of each time-domain resource to be scheduled. It can be understood that both the number information and the position information may be slot-level and/or symbol-level number information and position information and elaborations are omitted herein.

Figure 6:
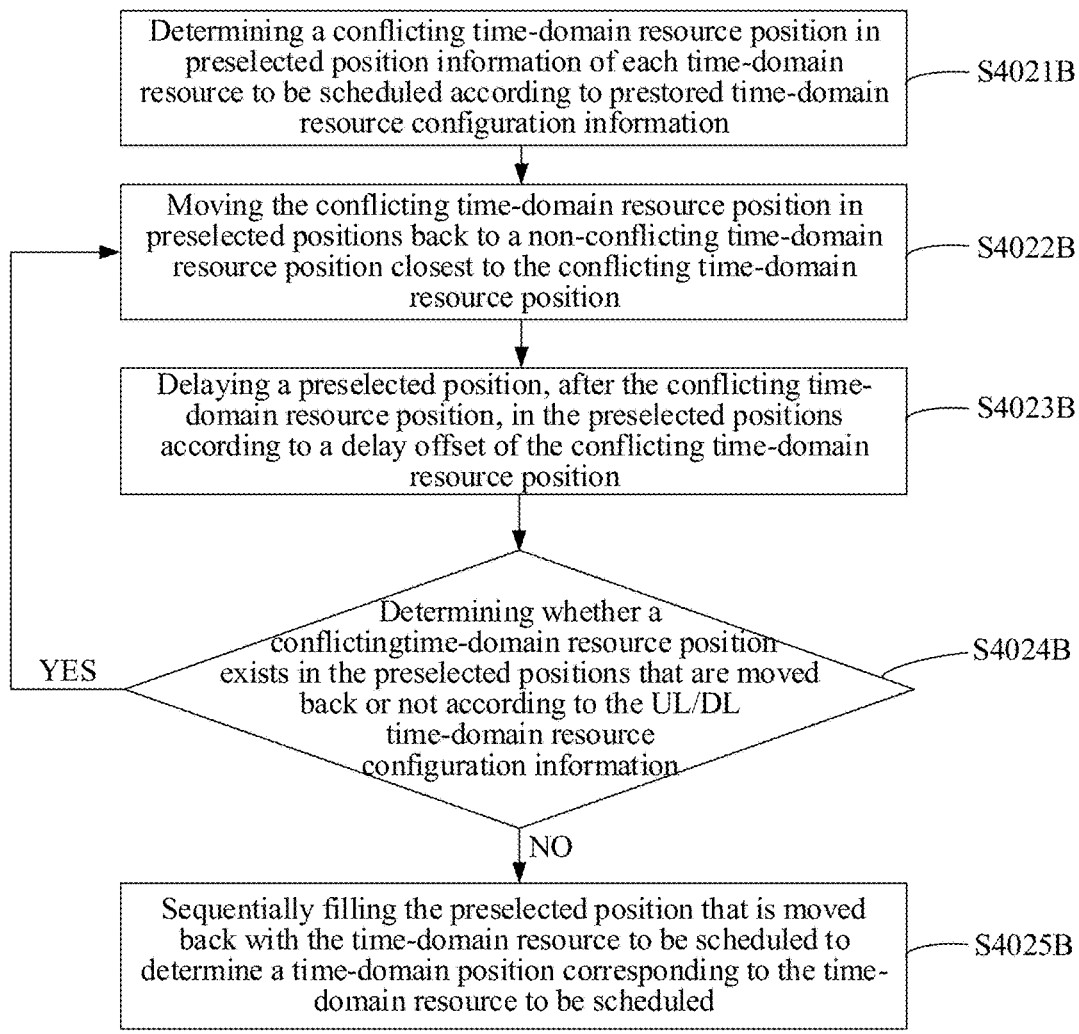
FIG. 6 is another flowchart of determining a time-domain position of a time-domain resource to be scheduled according to an embodiment of the disclosure.

Correspondingly, when the allocation information for scheduling a time-domain resource includes the information about the number of the time-domain resource to be scheduled and the preselected position information of the time-domain resource to be scheduled, referring to FIG. 6, the operation in S402 that the time-domain position is determined for the time-domain resource to be scheduled based on the preset rule according to the UL/DL time-domain resource configuration information and the allocation information may include the following operations.

In the operation S4021B, a conflicting time-domain resource position in the preselected position information of each time-domain resource to be scheduled is determined according to the UL/DL time-domain resource configuration information, the conflicting time-domain resource position in the UL/DL time-domain resource configuration information being a time-domain resource position with channel transmission direction opposite to that of the time-domain resource to be scheduled.

In the operation S4022B, the conflicting time-domain resource position in preselected positions is moved back to a non-conflicting time-domain resource position closest to the conflicting time-domain resource position. It can be understood that the non-conflicting time-domain resource position is a time-domain resource position in the same direction as the channel transmission direction of the time-domain resource to be scheduled in the UL/DL time-domain resource configuration information.

In the operation S4023B, a preselected position, after the conflicting time-domain resource position, in the preselected positions is delayed according to a delay offset of the conflicting time-domain resource position.

In the operation S4024B, whether a conflicting time-domain resource position exists in the preselected positions that are moved back or not is determined according to the UL/DL time-domain resource configuration information, if the conflicting time-domain resource position exists, the operation S4022B is executed until no conflicting time-domain resource position exists in the preselected positions that are moved back and the operation S4025B is executed, otherwise the operation S4025B is executed.

In the operation S4025B, the time-domain resource to be scheduled is sequentially filled into the preselected position that is moved back to determine the time-domain position corresponding to the time-domain resource to be scheduled.

It can be understood that, when a preset position of the time-domain resource to be scheduled in a slot conflicts with the whole slot position in time-domain configuration information, the conflicting preset position may be moved back to the closest non-conflicting slot position and a preset position after the conflicting preset position is delayed according to a delay offset of the conflicting preset position, thereby avoiding occurrence of a conflict.

In addition, the position information may be the symbol-level position information, therefore, when the preset position of the time-domain resource to be scheduled in the slot conflicts with part of the slot positions in the time-domain configuration information, a symbol at a conflicting preset position may be moved back according to the abovementioned process, a preset position after the conflicting preset position is delayed according to a delay offset of the conflicting preset position, and other non-conflicting preset positions are not changed.

According to the method for determining a time-domain resource provided in the embodiment, the terminal determines a time-domain position corresponding to the time-domain resource to be scheduled according to a determination rule predetermined with a base station to make the determined time-domain position matched with scheduling information regulated by the base station for the time-domain resource to be scheduled, so that the condition that the terminal may not transmit a channel within a short time period due to a conflict with time-domain configuration information during channel transmission of the terminal is avoided, a signaling overhead during channel transmission of the terminal and the base station is also reduced, and increased probability of false detection caused by repeated transmission of control signaling is further avoided.

Embodiment 2

Figure 7:
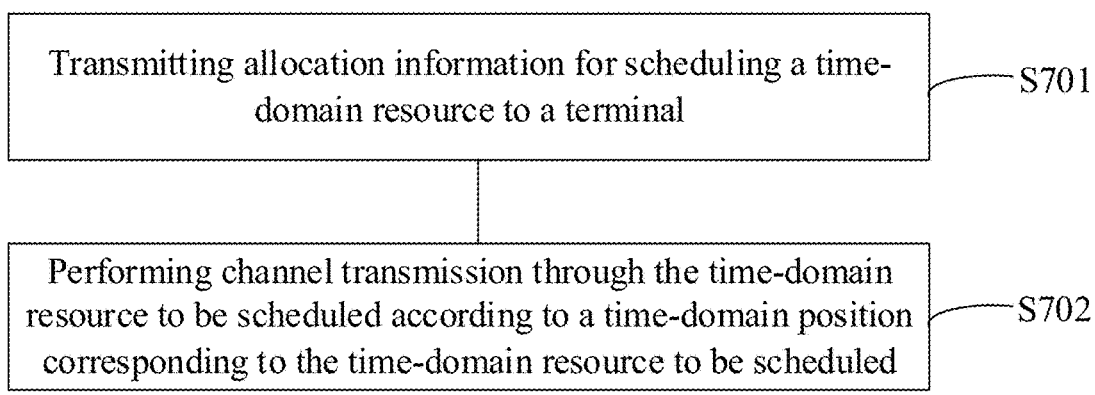
FIG. 7 is another flowchart of a method for determining a time-domain resource according to an embodiment of the disclosure.

Based on the same inventive concept of the abovementioned embodiment, referring to FIG. 7, a flow of a method for determining a time-domain resource provided in the embodiment of the disclosure is shown. The method may be applied to a network device, for example, a gNB. The method may include the following operations.

In the operation S701, allocation information for scheduling a time-domain resource is transmitted to a terminal.

The time-domain resource to be scheduled may include a time-domain resource required by channel transmission, and the allocation information is configured for the terminal to determine a time-domain position corresponding to the time-domain resource to be scheduled.

In the operation S702, channel transmission is performed with the terminal through the time-domain resource to be scheduled according to the time-domain position corresponding to the time-domain resource to be scheduled.

It is to be explained that a channel may include a data channel such as a PDSCH and a PUSCH, and may also include a control channel such as a PDCCH and a PUCCH.

It can be understood that the gNB, after finding a conflict shown in FIG. 2 or FIG. 3 between scheduling information and configuration information of the time-domain resource, may regulate the scheduling information of the time-domain resource to avoid the conflict, and the terminal may determine position information of the time-domain resource to be scheduled according to a determination rule predetermined by negotiation with the gNB and make the same regulation like the gNB does, that is, the time-domain position, determined by the terminal, corresponding to the time-domain resource to be scheduled is matched with the scheduling information obtained after the gNB regulates the time-domain resource to be scheduled. Therefore, the gNB may perform channel transmission with the terminal through the time-domain resource to be scheduled according to the time-domain position corresponding to the time-domain resource to be scheduled to avoid the condition that the terminal may not transmit the channel within a short time period due to the conflict between the scheduling information and the configuration information, and is not required to notify the terminal to reduce a signaling overhead between the terminal and the gNB and also avoid increased probability of false detection caused by repeated transmission of control signaling.

In a possible implementation mode, the allocation information for scheduling a time-domain resource may be carried in DCI. It can be understood that the DCI may be dynamically configured such that the gNB may timely transmit the allocation information to the terminal and the terminal may timely determine the position of the time-domain resource to be scheduled to avoid a conflict.

In a possible implementation mode, the method may further include that: UL/DL time-domain resource configuration information is transmitted to the terminal, the UL/DL time-domain resource configuration information including slot-level position information and/or symbol-level position information of an available time-domain resource. It is to be explained that information configured to represent a slot-based position of the time-domain resource is called slot-level position information of the time-domain resource and information configured to represent a symbol-based position of the time-domain resource is called symbol-level position information of the time-domain resource.

Specifically, the UL/DL time-domain resource configuration information may be predefined information, or may also be carried in RRC signaling and/or DCI and, in specific implementation, may be frame structure information and/or an SFI.

For the technical solution shown in FIG. 7, it is to be noted that the allocation information for scheduling a time-domain resource is not scheduling information obtained after the gNB regulates the time-domain resource to be scheduled but description information of the time-domain resource to be scheduled, and the terminal, after learning the description information of the time-domain resource to be scheduled, determines the time-domain position corresponding to the time-domain resource to be scheduled according to the determination rule obtained by negotiation with the gNB, so that the time-domain position, finally determined by the terminal, corresponding to the time-domain resource to be scheduled is matched with the scheduling information obtained after the gNB regulates the time-domain resource to be scheduled. Therefore, the gNB is not required to notify the terminal of the scheduling information obtained after the time-domain resource to be scheduled is regulated in a channel transmission process, and the signaling overhead between the gNB and the terminal in the channel transmission process is reduced. Therefore, as an atypical example, the allocation information for scheduling a time-domain resource may include information about the number of the time-domain resource to be scheduled; or, the allocation information for scheduling a time-domain resource may include the information about the number of the time-domain resource to be scheduled and preselected position information of each time-domain resource to be scheduled.

According to the method for determining a time-domain resource provided in the embodiment, a network device transmits allocation information for scheduling a time-domain resource to a terminal to enable the terminal to determine a time-domain position corresponding to the time-domain resource to be scheduled. Therefore, the gNB may perform channel transmission with the terminal through the time-domain resource to be scheduled according to the time-domain position corresponding to the time-domain resource to be scheduled to avoid the condition that the terminal may not transmit the channel within a short time period due to a conflict between the scheduling information and the configuration information, and may be not required to notify the terminal, thereby reducing a signaling overhead between the terminal and the gNB and also avoiding increased probability of false detection caused by repeated transmission of control signaling.

Embodiment 3

Based on the same inventive concept of the abovementioned embodiments, the technical solutions of the abovementioned embodiments are described in the embodiment with the following specific examples. It is to be noted that, in all the following specific examples, descriptions are made with adoption of a time-domain resource to be scheduled for transmission of a DL data channel such as a PDSCH as an example and a network device is, for example, a gNB. It can be understood that, in a practical application, the time-domain resource to be scheduled may also be configured to transmit a UL data channel such as a PUSCH, and a UL or DL control channel such as a PDCCH or a PUCCH. There are no elaborations made thereto in the specific examples of the embodiment.

Specific Example 1

Figure 8:
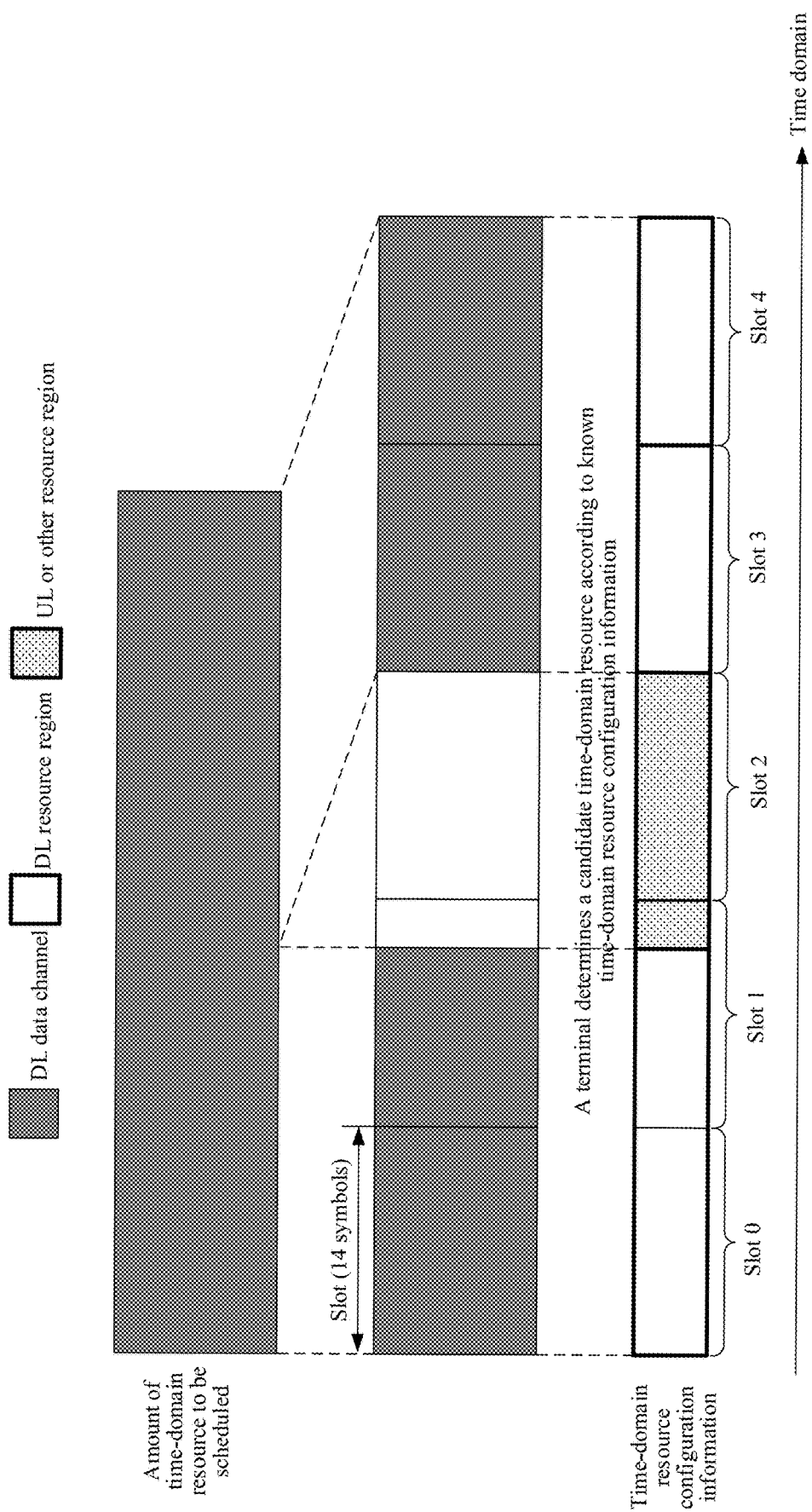
FIG. 8 is a schematic diagram of a specific process of determining a time-domain resource according to an embodiment of the disclosure.

For example, as shown in FIG. 8, it is to be noted that the first line in FIG. 8 is graphical information of FIG. 8.

The gNB transmits allocation information for scheduling a time-domain resource to a terminal. The allocation information may be a DL grant, and the allocation information may include information about the number of the time-domain resource to be scheduled, as shown in the gray block in the second line in FIG. 8. The number information may be slot-level or may also be symbol-level, so that the total number of the time-domain resource to be scheduled is two slots and a plurality of additional symbols. In the embodiment, the plurality of symbols are, for example, 10 symbols. Therefore, the terminal, after learning the number information of the resource to be scheduled, may determine a candidate time-domain resource according to known UL/DL time-domain resource configuration information, as shown in the distribution of the gray blocks in the third line in FIG. 8. It is to be noted that the configuration information of the UL/DL time-domain resource may specifically be DL/UL assignment. It can be seen from the configuration information of the UL/DL time-domain resource shown in the fourth line in FIG. 8 that a plurality of last symbols of a slot 1 and the whole slot 2 are all time-domain resource regions configured to transmit a UL channel or others and may conflict with transmission of the PDSCH. Therefore, the terminal, when determining the candidate time-domain resource, may avoid the conflicting regions. Then, the terminal may sequentially distribute the time-domain resource to be scheduled in the candidate time-domain resource, thereby determining a time-domain position of the time-domain resource configured to transmit the PDSCH.

Specific Example 2

Figure 9:
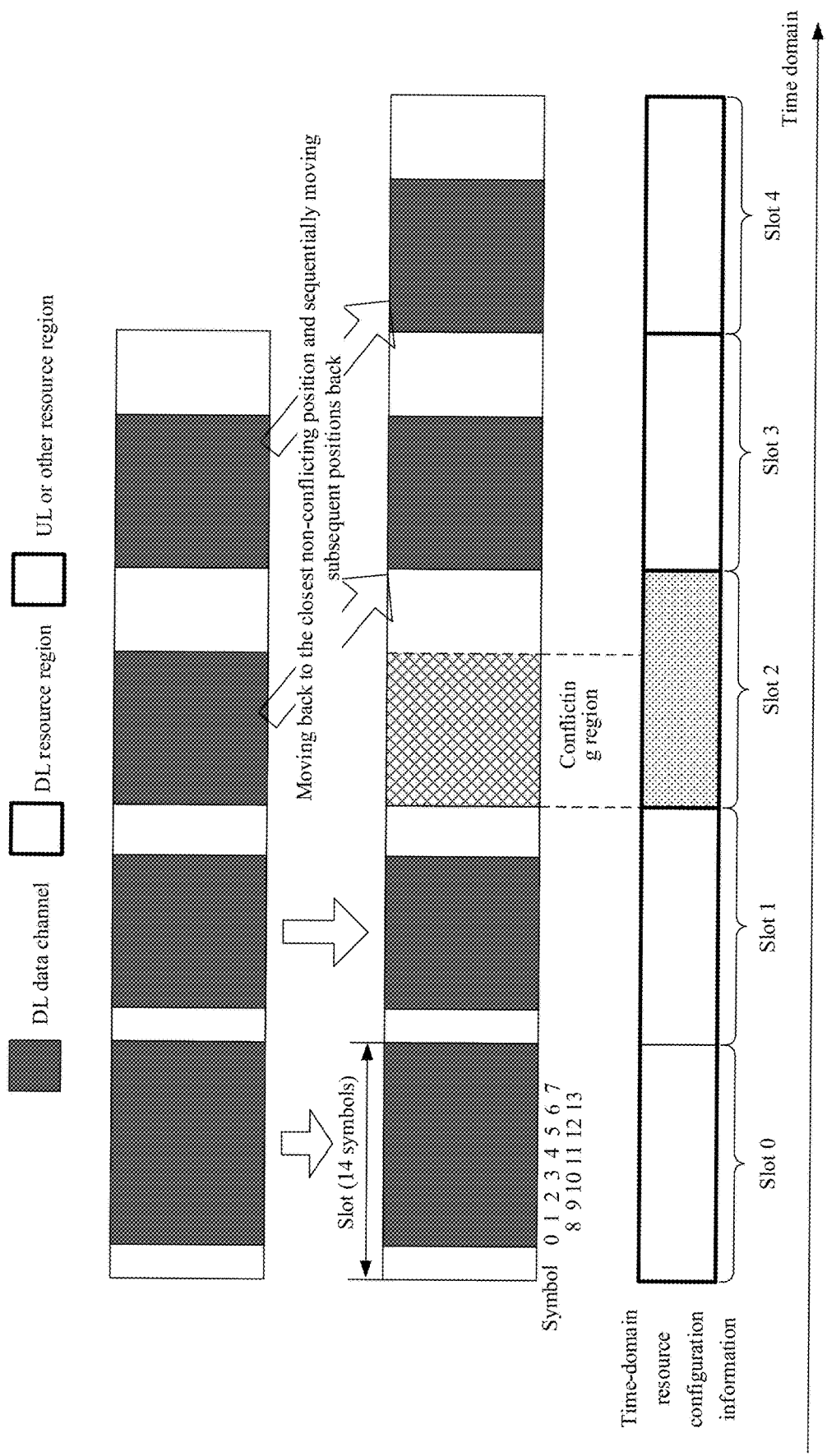
FIG. 9 is another schematic diagram of a specific process of determining a time-domain resource according to an embodiment of the disclosure.

For example, as shown in FIG. 9, it is to be noted that the first line in FIG. 9 is graphical information of FIG. 9.

The gNB transmits allocation information for scheduling a time-domain resource to a terminal. The allocation information may be a DL grant, and the allocation information may not only include information about the number of the time-domain resource to be scheduled, but also include preselected position information of each time-domain resource to be scheduled, as shown in the second line in FIG. 9. The terminal, after receiving the allocation information, may compare the preselected position information and known UL/DL time-domain resource configuration information in the fourth line in FIG. 9 to find that slot 2 is a time-domain resource region configured to transmit the UL channel or others and may conflict with transmission of the PDSCH. Therefore, the terminal may move a conflicting preset position corresponding to the slot 2 back to a non-conflicting position, i.e., slot 3, closest to the slot 2 and move a preset position after the conflicting position back according to the conflicting preset position to avoid a conflict, as shown in the third line in FIG. 9. After the preselected positions are moved back, the terminal sequentially fills the time-domain resource to be scheduled into the preselected position that is moved back, thereby determining the time-domain position corresponding to the resource to be scheduled.

Specific Example 3

Figure 10:
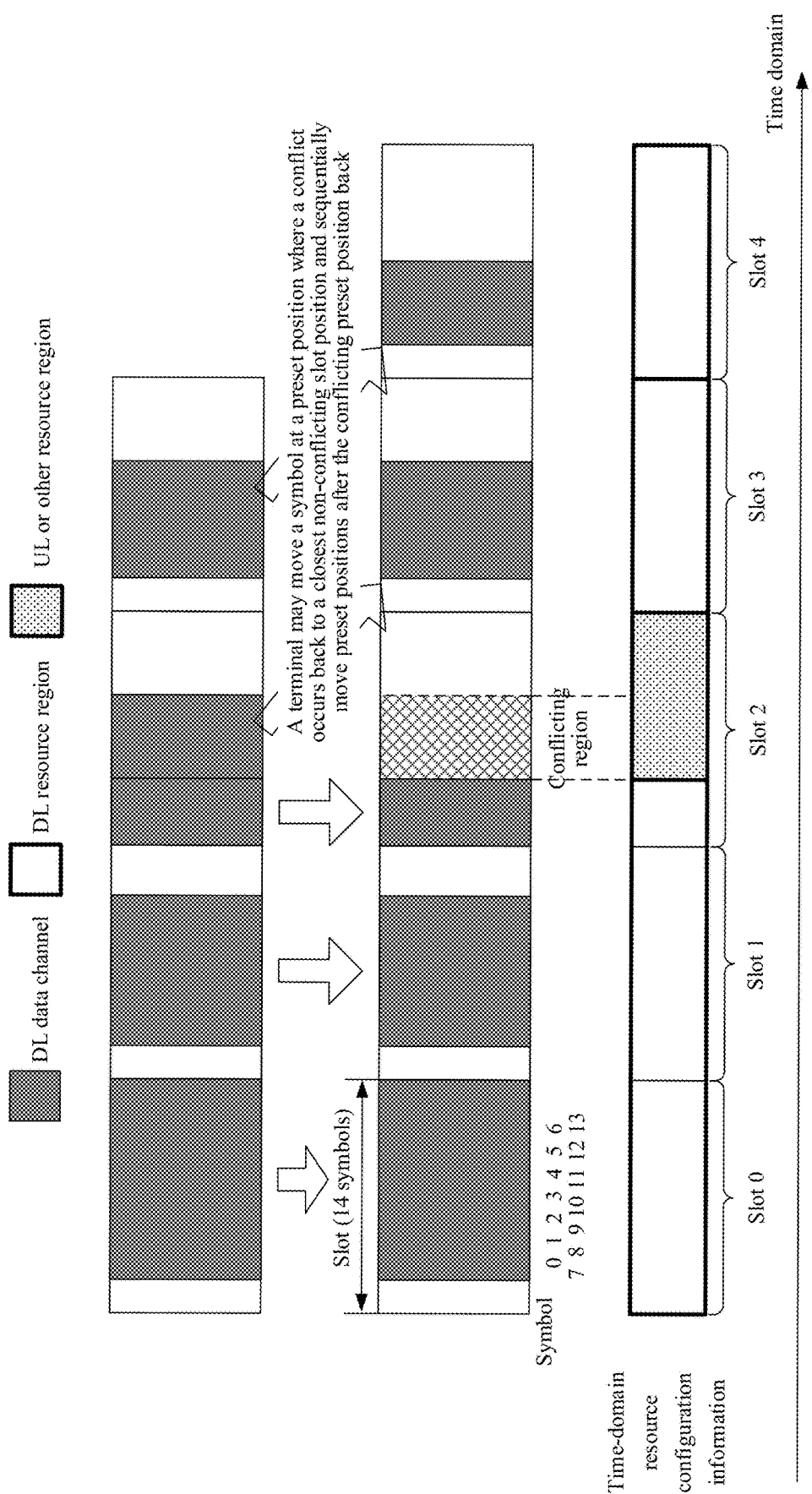
FIG. 10 is another schematic diagram of a specific process of determining a time-domain resource according to an embodiment of the disclosure.

For example, as shown in FIG. 10, it is to be noted that the first line in FIG. 10 is graphical information of FIG. 10.

Like specific example 2, the gNB transmits allocation information for scheduling a time-domain resource to a terminal. The allocation information may be a DL grant, and the allocation information may not only include information about the number of the time-domain resource to be scheduled, but also include preselected position information of each time-domain resource to be scheduled, as shown in the second line in FIG. 10. The terminal, after receiving the allocation information, may compare the preselected position information and known UL/DL time-domain resource configuration information shown in the fourth line in FIG. 10. However, in the specific example, a last part of a slot may conflict with part of preset positions of the time-domain resource to be scheduled, so that the terminal may move a symbol at a conflicting preset position back to a closest non-conflicting slot position, delay a preset position after the conflicting preset position according to a delay offset of the conflicting preset position and keep other non-conflicting preset positions unchanged to avoid a conflict, as shown in the third line in FIG. 10. After the preselected positions are moved back, the terminal may still sequentially fill the time-domain resource to be scheduled into the preselected position that is moved back according to the process in specific example 2, thereby determining the time-domain position corresponding to the resource to be scheduled.

Specific implementation of the technical solutions of the abovementioned embodiments are described above with the three specific examples in detail. It can be seen that a terminal may determine a time-domain position of a time-domain resource to be scheduled through allocation information transmitted by a gNB, thereby avoiding occurrence of a conflict. Moreover, since a determination result of the terminal is matched with a result obtained by scheduling regulation of the gNB, the terminal, during channel transmission with the gNB, is not required to learn a regulation result of time-domain resource scheduling of the gNB by signaling interaction, which reduces the signaling overhead and also avoids increased probability of false detection caused by repeated transmission of control signaling.

Embodiment 4

Figure 11:
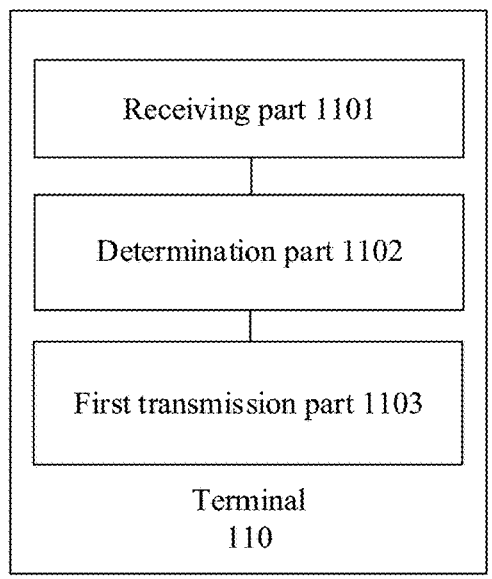
FIG. 11 is a schematic diagram of composition of a terminal according to an embodiment of the disclosure.

Based on the same inventive concept of the abovementioned embodiments, referring to FIG. 11, a structure of a terminal 110 provided in the embodiment of the disclosure is shown, and may include a receiving part 1101, a determination part 1102 and a first transmission part 1103.

The receiving part 1101 is configured to receive allocation information for scheduling a time-domain resource from a network device, the time-domain resource to be scheduled including a time-domain resource required by channel transmission.

The determination part 1102 is configured to determine a time-domain position corresponding to the time-domain resource to be scheduled based on a preset rule according to UL/DL time-domain resource configuration information and the allocation information.

The first transmission part 1103 is configured to perform channel transmission with the network device through the time-domain resource to be scheduled according to the time-domain position corresponding to the time-domain resource to be scheduled.

In a possible implementation mode, the allocation information for scheduling a time-domain resource may include information about the number of the time-domain resource to be scheduled.

In the implementation mode, the determination part 1102 is configured to:

determine a candidate time-domain resource for the time-domain resource to be scheduled according to the UL/DL time-domain resource configuration information; the number of the candidate time-domain resource is matched with the quantity of the time-domain resource to be scheduled, and the position of the candidate time-domain resource and the position of the conflict time-domain resource of the UL/DL time-domain resource configuration information do not coincide, the position of the conflict time-domain resource in the UL/DL time-domain resource configuration information being a time-domain resource position with a channel transmission direction opposite to that of the time-domain resource to be scheduled; and determine the time-domain position corresponding to the time-domain resource to be scheduled by sequentially filling the time-domain resource to be scheduled into the candidate time-domain resource.

In a possible implementation mode, the allocation information for scheduling a time-domain resource may include information about the number of the time-domain resource to be scheduled and preselected position information of each time-domain resource to be scheduled.

In the implementation mode, the determination part 1102 is configured to:

operation 1: determine a conflicting time-domain resource position from the preselected position information of each time-domain resource to be scheduled according to the UL/DL time-domain resource configuration information, the conflicting time-domain resource position in the UL/DL time-domain resource configuration information being a time-domain resource position with a channel transmission direction opposite to that of the time-domain resource to be scheduled;

operation 2: move the conflicting time-domain resource position in preselected positions back to a non-conflicting time-domain resource position closest to the conflicting time-domain resource position;

operation 3: delay a preselected position, after the conflicting time-domain resource position, in the preselected positions according to a delay offset of the conflicting time-domain resource position;

operation 4: determine whether a conflicting time-domain resource position exists in the preselected positions that are moved back or not according to the UL/DL time-domain resource configuration information, if the conflicting time-domain resource position exists, turn to the operation 2 until no conflicting time-domain resource position exists in the preselected positions that are moved back and execute the operation 5, otherwise execute the operation 5; and operation 5: sequentially fill the time-domain resource to be scheduled into the preselected position that is moved back to determine the time-domain position corresponding to the time-domain resource to be scheduled.

In a possible implementation mode, the receiving part 1101 is further configured to receive the UL/DL time-domain resource configuration information transmitted by the network device, the UL/DL time-domain resource configuration information including slot-level position information and/or symbol-level position information of an available time-domain resource.

In a possible implementation mode, a channel may include a data channel or a control channel.

In a possible implementation mode, the allocation information for scheduling a time-domain resource may be carried in DCI.

In a possible implementation mode, the UL/DL time-domain resource configuration information may be predefined information, or, the UL/DL time-domain resource configuration information may be carried in RRC signaling and/or DCI.

In the implementation mode, the UL/DL time-domain resource configuration information may be frame structure information and/or an SFI.

It can be understood that, in the embodiment, "part" may be part of a circuit, part of a processor, part of a program or software and the like, of course, may also be a unit, and may also be modular or non-modular.

In addition, each component in the embodiment may be integrated into a processing unit, each unit may also exist independently, and two or more than two units may also be integrated into a unit. The integrated unit may be implemented in a hardware form or may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the operations of the method in the embodiment. The storage medium includes: various media capable of storing program codes such as a U disk, a mobile hard disk, a Read Only Memory (ROM), a Random Access Memory (RAM), a magnetic disk or an optical disk.

Therefore, the embodiment provides a computer-readable medium, which stores a program for determining a time-domain resource, the program for determining a time-domain resource being executable by at least one processor to implement the operations of the method of embodiment 1.

Figure 12:
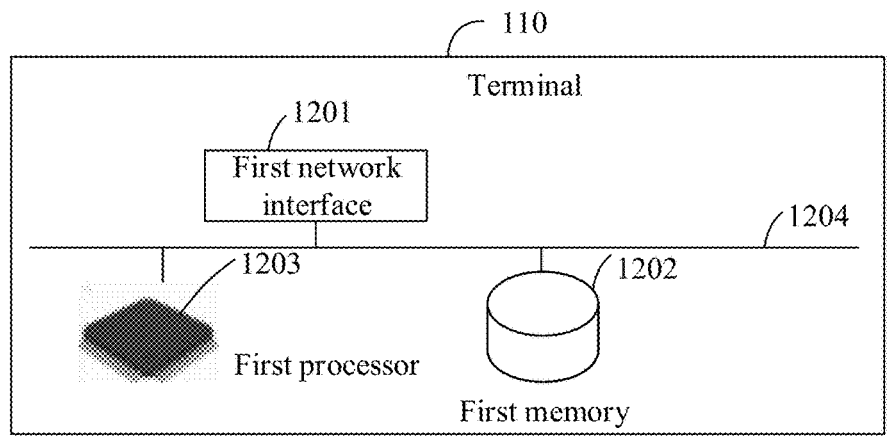
FIG. 12 is a hardware structure diagram of a terminal according to an embodiment of the disclosure.

Based on the terminal 110 and the computer-readable medium, referring to FIG. 12, a specific hardware structure of the terminal 110 provided in the embodiment of the disclosure is shown, and may include a first network interface 1201, a first memory 1202 and a first processor 1203. Each component is coupled together through a bus system 1204. It can be understood that the bus system 1204 is configured to implement connection and communication between these components. The bus system 1204 may include a data bus and further include a power bus, a control bus and a state signal bus. However, for clear description, various buses in FIG. 12 are marked as the bus system 1204. The first network interface 1201 is configured to receive and transmit a signal in a process of receiving and transmitting information with another external network element.

The first memory 1202 is configured to store a computer program capable of running in the first processor 1203.

The first processor 1203 is configured to run the computer program to:
receive allocation information for scheduling a time-domain resource from a network device, the time-domain resource to be scheduled including a time-domain resource required by channel transmission;
determine a time-domain position corresponding to the time-domain resource to be scheduled based on a preset rule according to UL/DL time-domain resource configuration information and the allocation information; and
perform channel transmission with the network device through the time-domain resource to be scheduled according to the time-domain position corresponding to the time-domain resource to be scheduled.

It can be understood that the first memory 1202 in the embodiment of the disclosure may be a volatile memory or a nonvolatile memory, or may include both the volatile and nonvolatile memories. The nonvolatile memory may be a ROM, a Programmable ROM (PROM), an Erasable PROM (EPROM), an Electrically EPROM (EEPROM) or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). It is to be noted that the first memory 1202 of a system and the method described in the disclosure is intended to include, but not limited to, memories of these and any other proper types.

The first processor 1203 may be an integrated circuit chip with a signal processing capability. In an implementation process, each operation of the method may be completed by an integrated logic circuit of hardware in the first processor 1203 or an instruction in a software form. The first processor 1203 may be a universal processor, a Digital Signal Processor (DSP), an Application Specific Integrated Circuit (ASIC), a Field Programmable Gate Array (FPGA) or another Programmable Logic Device (PLD), discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 1202. The first processor 1203 reads information in the first memory 1202 and completes the operations of the method in combination with hardware.

It can be understood that these embodiments described in the disclosure may be implemented by hardware, software, firmware, middleware, a microcode or a combination thereof. In case of implementation with the hardware, the processing unit may be implemented in one or more ASICs, DSPs, DSPDs, PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Optionally, as another embodiment, the allocation information for scheduling a time-domain resource may include information about the number of the time-domain resource to be scheduled.

In the abovementioned optional embodiment, the first processor 1203 is further configured to run the computer program to execute the following operations:
determine a candidate time-domain resource for the time-domain resource to be scheduled according to the UL/DL time-domain resource configuration information; the quantity of the candidate time-domain resource is matched with the quantity of the time-domain resource to be scheduled, and the position of the candidate time-domain resource and the position of the conflict time-domain resource of the UL/DL time-domain resource configuration information do not coincide, the position of the conflict time-domain resource in the UL/DL time-domain resource configuration information being a time-domain resource position opposite to the time-domain resource to be scheduled in the aspect of channel transmission direction; and sequentially fill the time-domain resource to be scheduled into the candidate time-domain resource to determine the time-domain position corresponding to the time-domain resource to be scheduled.

Optionally, as another embodiment, the allocation information for scheduling a time-domain resource may include information about the number of the time-domain resource to be scheduled and preselected position information of each time-domain resource to be scheduled.

In the abovementioned optional embodiment, the first processor 1203 is further configured to run the computer program to execute the following operations:

operation 1: determine a conflicting time-domain resource position from the preselected position information of each time-domain resource to be scheduled according to the UL/DL time-domain resource configuration information, the conflicting time-domain resource position in the UL/DL time-domain resource configuration information being a time-domain resource position with a channel transmission direction opposite to that of the time-domain resource to be scheduled;

operation 2: move the conflicting time-domain resource position in preselected positions back to a non-conflicting time-domain resource position closest to the conflicting time-domain resource position;

operation 3: delay a preselected position, after the conflicting time-domain resource position, in the preselected positions according to a delay offset of the conflicting time-domain resource position;

operation 4: determine whether a conflicting time-domain resource position exists in the preselected positions that are moved back or not according to the UL/DL time-domain resource configuration information, if the conflicting time-domain resource position exists, turn to the operation 2 until no conflicting time-domain resource position exists in the preselected positions that are moved back and execute the operation 5, otherwise execute the operation 5; and operation 5: sequentially fill the time-domain resource to be scheduled into the preselected position that is moved back to determine the time-domain position corresponding to the time-domain resource to be scheduled.

Optionally, as another embodiment, a channel may include a data channel or a control channel.

Optionally, as another embodiment, the allocation information for scheduling a time-domain resource may be carried in DCI.

Optionally, as another embodiment, the first processor 1203 is further configured to run the computer program to execute the following operations:

receive the UL/DL time-domain resource configuration information transmitted by the network device, the UL/DL time-domain resource configuration information including slot-level position information and/or symbol-level position information of an available time-domain resource.

Optionally, as another embodiment, the UL/DL time-domain resource configuration information may be predefined information, or, the UL/DL time-domain resource configuration information is carried in RRC signaling and/or DCI.

In the abovementioned optional embodiment, the UL/DL time-domain resource configuration information is frame structure information and/or an SFI.

Embodiment 5

Figure 13:
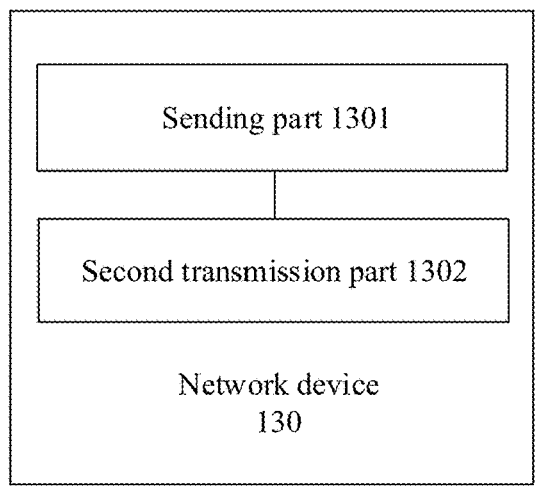
FIG. 13 is a schematic diagram of composition of a network device according to an embodiment of the disclosure.

Based on the same inventive concept of the abovementioned embodiments, referring to FIG. 13, a structure of a network device 130 provided in the embodiment of the disclosure is shown, and may include a sending part 1301 and a second transmission part 1302.

The sending part 1301 is configured to transmit allocation information for scheduling a time-domain resource to a terminal, the time-domain resource to be scheduled including a time-domain resource required by channel transmission and the allocation information being configured for the terminal to determine a time-domain position corresponding to the time-domain resource to be scheduled.

The second transmission part 1302 is configured to perform channel transmission with the terminal through the time-domain resource to be scheduled according to the time-domain position corresponding to the time-domain resource to be scheduled.

In a possible implementation mode, the sending part 1301 is further configured to transmit UL/DL time-domain resource configuration information to the terminal, the UL/DL time-domain resource configuration information including slot-level position information and/or symbol-level position information of an available time-domain resource.

In a possible implementation mode, a channel may include a data channel or a control channel.

In a possible implementation mode, the allocation information for scheduling a time-domain resource may be carried in DCI.

In a possible implementation mode, the UL/DL time-domain resource configuration information may be predefined information, or, the UL/DL time-domain resource configuration information may be carried in RRC signaling and/or DCI. In the implementation mode, the UL/DL time-domain resource configuration information may be frame structure information and/or an SFI.

In a possible implementation mode, the allocation information for scheduling a time-domain resource may include information about the number of the time-domain resource to be scheduled; or, the allocation information for scheduling a time-domain resource may include information about the number of the time-domain resource to be scheduled and preselected position information of each time-domain resource to be scheduled.

It can be understood that, in the embodiment, "part" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form or may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product may be stored in a storage medium, including a plurality of instructions configured to enable a computer device (which may be a personal computer, a server, a network device or the like) or a processor to execute all or part of the operations of the method in the embodiment. The storage medium may include: various media capable of storing program codes such as a U disk, a mobile hard disk, a Read Only Memory (ROM), a Random Access Memory (RAM), a magnetic disk or an optical disk.

Therefore, the embodiment provides a computer-readable medium, which stores a time-domain resource determination program, the time-domain resource determination program being executable by at least one processor to implement the operations of the method of embodiment 2.

Figure 14:
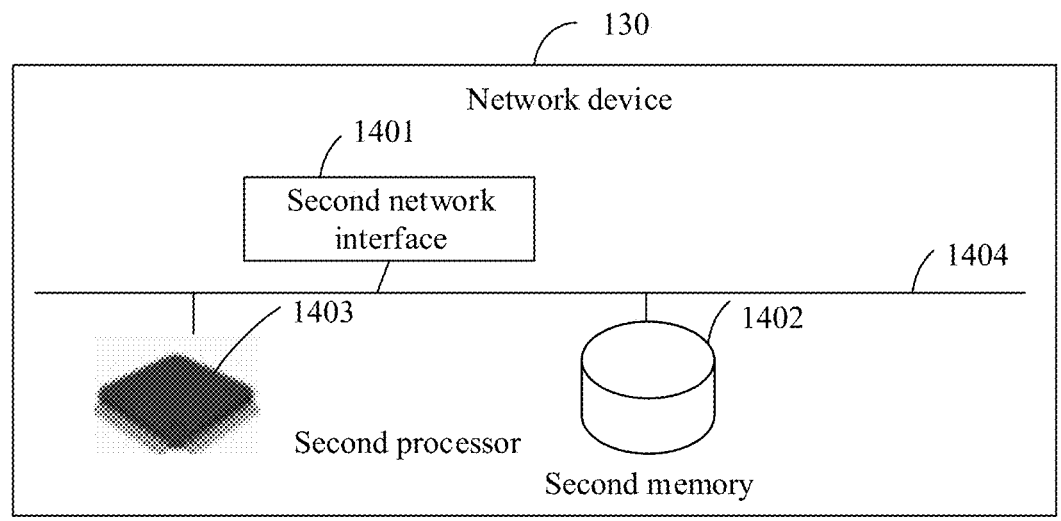
FIG. 14 is a hardware structure diagram of a network device according to an embodiment of the disclosure.

Based on the network device 130 and the computer-readable medium, referring to FIG. 14, a specific hardware structure of the network device 130 provided in the embodiment of the disclosure is illustrated, which may include:

- a second network interface 1401, a second memory 1402 and a second processor 1403; each component is coupled together through a bus system 1404; it can be understood that the bus system 1404 is configured to implement connection and communication between these components; the bus system 1404 may include a data bus and further include a power bus, a control bus and a state signal bus; however, for clear description, various buses in FIG. 14 are marked as the bus system 1404;
- the second network interface 1401 is configured to receive and transmit a signal in a process of receiving and transmitting information with another external network element.

The second memory 1402 is configured to store a computer program capable of running in the second processor 1403.

The second processor 1403 is configured to run the computer program to:

- send allocation information for scheduling a time-domain resource to a terminal, the time-domain resource to be scheduled including a time-domain resource required by channel transmission and the allocation information being configured for the terminal to determine a time-domain position corresponding to the time-domain resource to be scheduled; and
- perform channel transmission with the terminal through the time-domain resource to be scheduled according to the time-domain position corresponding to the time-domain resource to be scheduled.

Optionally, as another embodiment, the channel may include a data channel or a control channel.

Optionally, as another embodiment, the allocation information for scheduling a time-domain resource may be carried in DCI.

Optionally, as another embodiment, the second processor 1403 is further configured to run the computer program to execute the following operations: send the UL/DL time-domain resource configuration information to the terminal, the UL/DL time-domain resource configuration information including slot-level position information and/or symbol-level position information of an available time-domain resource.

Optionally, as another embodiment, the UL/DL time-domain resource configuration information may be pre-defined information, or, the UL/DL time-domain resource configuration information may be carried in RRC signaling and/or DCI.

In the embodiment, the UL/DL time-domain resource configuration information may be frame structure information and/or an SFI.

Optionally, as another embodiment, the allocation information for scheduling a time-domain resource may include information about the number of the time-domain resource to be scheduled; or, the allocation information for scheduling a time-domain resource may include information about the number of the time-domain resource to be scheduled and preselected position information of each time-domain resource to be scheduled.

Embodiment 6

Figure 15:
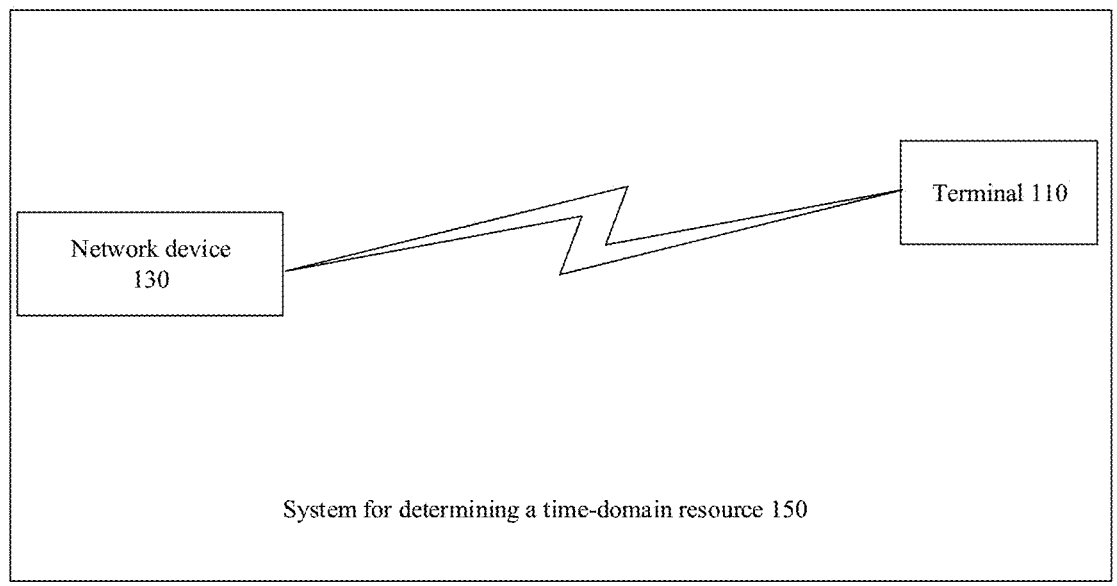
FIG. 15 is a schematic diagram of composition of a system for determining a time-domain resource according to an embodiment of the disclosure.

Based on the same inventive concept of the abovementioned embodiments, referring to FIG. 15, a system for determining a time-domain resource 150 provided in the embodiment of the disclosure is shown, and may include a terminal 110 and a network device 130.

The network device 130 is configured to:

- transmit allocation information for scheduling a time-domain resource to the terminal 110, the time-domain resource to be scheduled including a time-domain resource required by channel transmission and the allocation information being configured for the terminal to determine a time-domain position corresponding to the time-domain resource to be scheduled, and
- perform channel transmission with the terminal 110 through the time-domain resource to be scheduled according to the time-domain position corresponding to the time-domain resource to be scheduled.

The terminal 110 is configured to:

- receive the allocation information for scheduling a time-domain resource from the network device 130, the time-domain resource to be scheduled including the time-domain resource required by channel transmission;
- determine a time-domain position corresponding to the time-domain resource to be scheduled based on a preset rule according to UL/DL time-domain resource configuration information and the allocation information, and
- perform channel transmission with the network device 130 through the time-domain resource to be scheduled according to the time-domain position corresponding to the time-domain resource to be scheduled.

In a specific implementation process, the network device 130 in the embodiment may preferably be the network device 130 in any abovementioned embodiment, and the terminal 110 may preferably be the terminal 110 in any abovementioned embodiment.

Those skilled in the art should understand that the embodiments of the disclosure can provide a method, a system or a computer program product. Thus, forms of hardware embodiments, software embodiments or embodiments integrating software and hardware can be adopted in the disclosure. Moreover, a form of the computer program product implemented on one or more computer available storage media (including, but not limited to, a disk memory, an optical memory and the like) containing computer available program codes can be adopted in the disclosure.

The disclosure is described with reference to flowcharts and/or block diagrams of the method, the equipment (system) and the computer program product according to the embodiments of the disclosure. It should be understood that each flow and/or block in the flowcharts and/or the block diagrams and a combination of the flows and/or the blocks in the flowcharts and/or the block diagrams can be realized by computer program instructions. These computer program instructions can be provided for a general computer, a dedicated computer, an embedded processor or processors of other programmable data processing devices to generate a machine, so that an apparatus for realizing functions assigned in one or more flows of the flowcharts and/or one or more blocks of the block diagrams is generated via instructions executed by the computers or the processors of the other programmable data processing devices.

These computer program instructions can also be stored in a computer readable memory capable of guiding the computers or other programmable data processing devices to work in a specific mode, so that a manufactured product including an instruction apparatus is generated via the instructions stored in the computer readable memory, and the instruction apparatus realizes the functions assigned in one or more flows of the flowcharts and/or one or more blocks of the block diagrams.

These computer program instructions can also be loaded to the computers or the other programmable data processing devices, so that processing realized by the computers is generated by executing a series of operation operations on the computers or the other programmable devices, and therefore the instructions executed on the computers or the other programmable devices provide an operation of realizing the functions assigned in one or more flows of the flowcharts and/or one or more blocks of the block diagrams.

The above is only the preferred embodiment of the disclosure and not intended to limit the scope of protection of the disclosure.

INDUSTRIAL APPLICABILITY

In the embodiments, the terminal determines a time-domain position corresponding to a time-domain resource to be scheduled according to a determination rule predetermined with a base station to make the determined time-domain position matched with scheduling information regulated by the base station for the time-domain resource to be scheduled, so that the condition that the terminal may not transmit a channel within a short time period due to a conflict with time-domain configuration information during channel transmission of the terminal is avoided, a signaling overhead during channel transmission of the terminal and the base station is also reduced, and the increased probability of false detection caused by repeated transmission of control signaling is further avoided.

The invention claimed is:

1. A method for determining a time-domain resource, implemented by a terminal and comprising:
   receiving, from a network device, allocation information for scheduling a time-domain resource, the time-domain resource to be scheduled comprising a time-domain resource for transmission of a channel;
   determining a time-domain position corresponding to the time-domain resource to be scheduled based on a preset rule according to Uplink (UL)/Downlink (DL) time-domain resource configuration information and the allocation information; and
   performing channel transmission with the network device through the time-domain resource to be scheduled according to the time-domain position corresponding to the time-domain resource to be scheduled,
   wherein the allocation information for scheduling a time-domain resource comprises information about the number of the time-domain resource to be scheduled, wherein the information about the number of the time-domain resource to be scheduled comprises the number of a symbol and the number of a slot,
   wherein determining the time-domain position corresponding to the time-domain resource to be scheduled based on the preset rule according to the UL/DL time-domain resource configuration information and the allocation information comprises:
   determining a candidate time-domain resource for the time-domain resource to be scheduled according to the UL/DL time-domain resource configuration information, the amount of the candidate time-domain resource being matched with the amount of the time-domain resource to be scheduled, a position of the candidate time-domain resource not coinciding with a conflict time-domain resource position in the UL/DL time-domain resource configuration information, and the conflict time-domain resource position in the UL/DL time-domain resource configuration information being a time-domain resource position opposite to the time-domain resource to be scheduled in the aspect of channel transmission direction; and
   determining the time-domain position corresponding to the time-domain resource to be scheduled by filling the time-domain resource to be scheduled into the candidate time-domain resource.

2. The method of claim 1, wherein filling the time-domain resource to be scheduled into the candidate time-domain resource comprises:
   sequentially filling the time-domain resource to be scheduled into the candidate time-domain resource.

3. The method of claim 1, wherein the allocation information for scheduling a time-domain resource further comprises preselected position information of each of the time-domain resource to be scheduled.

4. The method of claim 3, wherein determining the time-domain position corresponding to the time-domain resource to be scheduled based on the preset rule according to the UL/DL time-domain resource configuration information and the allocation information comprises:
   operation 1: determining a conflicting time-domain resource position from the preselected position information of each of the time-domain resource to be scheduled according to the UL/DL time-domain resource configuration information, wherein the conflicting time-domain resource position in the UL/DL time-domain resource configuration information is a time-domain resource position with a channel transmission direction opposite to that of the time-domain resource to be scheduled;
   operation 2: moving the conflicting time-domain resource position in preselected positions back to a non-conflicting time-domain resource position closest to the conflicting time-domain resource position;
   operation 3: delaying a preselected position, after the conflicting time-domain resource position, in the preselected positions according to a delay offset of the conflicting time-domain resource position;
   operation 4: determining whether a conflicting time-domain resource position exists in the preselected positions that are moved back or not according to the UL/DL time-domain resource configuration information, and if the conflicting time-domain resource position exists, turning to the operation 2 until no conflicting time-domain resource position exists in the preselected positions that are moved back and executing operation 5; otherwise if no conflicting time-domain resource position exists, executing operation 5; and operation 5: determining the time-domain position corresponding to the time-domain resource to be scheduled by sequentially filling the time-domain resource to be scheduled into the preselected position that is moved back.

5. The method of claim 1, wherein the channel comprises a data channel or a control channel.

6. The method of claim 1, wherein the allocation information for scheduling a time-domain resource is carried in Downlink Control Information (DCI).

7. The method of claim 1, further comprising:
receiving the UL/DL time-domain resource configuration information transmitted by the network device, the UL/DL time-domain resource configuration information comprising at least one of slot-level position information and symbol-level position information of an available time-domain resource.

8. The method of claim 1, wherein the UL/DL time-domain resource configuration information is predefined information, or, the UL/DL time-domain resource configuration information is carried in at least one of Radio Resource Control (RRC) signaling and DCI.

9. The method of claim 8, wherein the UL/DL time-domain resource configuration information is frame structure information and/or a Slot Format Indicator (SFI).

10. A terminal, comprising a first network interface, a first memory and a first processor, wherein
the first network interface is configured to receive allocation information for scheduling a time-domain resource from a network device, the time-domain resource to be scheduled comprising a time-domain resource for channel transmission;
the first processor is configured to determine a time-domain position corresponding to the time-domain resource to be scheduled based on a preset rule according to Uplink (UL)/Downlink (DL) time-domain resource configuration information and the allocation information; and
the first network interface is further configured to perform channel transmission with the network device through the time-domain resource to be scheduled according to the time-domain position corresponding to the time-domain resource to be scheduled,
wherein the allocation information for scheduling a time-domain resource comprises information about the number of the time-domain resource to be scheduled, wherein the information about the number of the time-domain resource to be scheduled comprises the number of a symbol and the number of a slot,
wherein the first processor is configured to:
determine a candidate time-domain resource for the time-domain resource to be scheduled according to the UL/DL time-domain resource configuration information, the amount of the candidate time-domain resource being matched with the amount of the time-domain resource to be scheduled, a position of the candidate time-domain resource not coinciding with a conflict time-domain resource position in the UL/DL time-domain resource configuration information and the conflict time-domain resource position in the UL/DL time-domain resource configuration information being a time-domain resource position with a channel transmission direction opposite to that of the time-domain resource to be scheduled; and
determine the time-domain position corresponding to the time-domain resource to be scheduled by filling the time-domain resource to be scheduled into the candidate time-domain resource.

11. The terminal of claim 10, wherein the first processor is further configured to:
determine the time-domain position corresponding to the time-domain resource to be scheduled by sequentially filling the time-domain resource to be scheduled into the candidate time-domain resource.

12. The terminal of claim 10, wherein the allocation information for scheduling a time-domain resource further comprises preselected position information of each time-domain resource to be scheduled.

13. The terminal of claim 12, wherein the first processor is configured to:
operation 1: determine a conflicting time-domain resource position from the preselected position information of each of the time-domain resource to be scheduled according to the UL/DL time-domain resource configuration information, the conflicting time-domain resource position in the UL/DL time-domain resource configuration information being a time-domain resource position with a channel transmission direction opposite to that of the time-domain resource to be scheduled;
operation 2: move the conflicting time-domain resource position in preselected positions back to a non-conflicting time-domain resource position closest to the conflicting time-domain resource position;
operation 3: delay a preselected position, after the conflicting time-domain resource position, in the preselected positions according to a delay offset of the conflicting time-domain resource position;
operation 4: determine whether a conflicting time-domain resource position exists in the preselected positions that are moved back or not according to the UL/DL time-domain resource configuration information, if the conflicting time-domain resource position exists, turn to the operation 2 until no conflicting time-domain resource position exists in the preselected positions that are moved back and execute operation 5, otherwise if no conflicting time-domain resource position exists, execute operation 5; and
operation 5: determine the time-domain position corresponding to the time-domain resource to be scheduled by sequentially filling the time-domain resource to be scheduled into the preselected position that is moved back.

14. The terminal of claim 10, wherein the channel comprises a data channel or a control channel.

15. The terminal of claim 10, wherein the allocation information for scheduling a time-domain resource is carried in Downlink Control Information (DCI).

16. The terminal of claim 10, wherein the first network interface is further configured to receive the UL/DL time-domain resource configuration information transmitted by the network device, the UL/DL time-domain resource configuration information comprising at least one of slot-level position information and symbol-level position information of an available time-domain resource.

17. The terminal of claim 10, wherein the UL/DL time-domain resource configuration information is predefined information, or, the UL/DL time-domain resource configuration information is carried in at least one of Radio Resource Control (RRC) signaling and DCI.

18. A non-transitory computer-readable medium, having a program stored thereon that, when executed by at least one processor of a terminal, causes the terminal to implement the operations of the method of claim 1.

* * * * *